(12) United States Patent
Murthy et al.

(10) Patent No.: US 11,634,105 B2
(45) Date of Patent: Apr. 25, 2023

(54) WINDSHIELD WIPER OPERATIONS FOR AIRCRAFT

(71) Applicant: Rosemount Aerospace Inc., Burnsville, MN (US)

(72) Inventors: Muthukumar Murthy, Tamil Nadu (IN); Ashok Kumar Thirunarayana, Karnataka (IN)

(73) Assignee: ROSEMOUNT AEROSPACE, INC., Burnsville, MN (US)

( * ) Notice: Subject to any disclaimer, the term of this patent is extended or adjusted under 35 U.S.C. 154(b) by 544 days.

(21) Appl. No.: 16/802,866

(22) Filed: Feb. 27, 2020

(65) Prior Publication Data

US 2021/0179024 A1 Jun. 17, 2021

(30) Foreign Application Priority Data

Dec. 13, 2019 (IN) .............................. 201911051814

(51) Int. Cl.
*B60S 1/08* (2006.01)
*B64C 1/14* (2006.01)

(52) U.S. Cl.
CPC ........... *B60S 1/0814* (2013.01); *B60S 1/0818* (2013.01); *B60S 1/0859* (2013.01); *B60S 1/0896* (2013.01); *B64C 1/1476* (2013.01)

(58) Field of Classification Search
CPC .... B60S 1/0814; B60S 1/0818; B60S 1/0859; B60S 1/0896; B64C 13/503; B64C 1/1476
USPC ....................................... 701/3, 130, 36, 120
See application file for complete search history.

(56) References Cited

U.S. PATENT DOCUMENTS

| | | | |
|---|---|---|---|
| 5,404,085 A | 4/1995 | Resch et al. | |
| 7,148,634 B2 | 12/2006 | Padoan | |
| 8,600,583 B2 | 12/2013 | Fervel et al. | |
| 9,079,567 B2 | 7/2015 | Wegner et al. | |
| 2003/0030393 A1* | 2/2003 | Morishita | B60S 1/0818 318/400.08 |
| 2005/0174082 A1* | 8/2005 | Tanida | B60S 1/0818 318/483 |
| 2011/0118906 A1* | 5/2011 | Fervel | B64C 13/503 701/3 |

(Continued)

FOREIGN PATENT DOCUMENTS

| | | |
|---|---|---|
| CN | 107264475 A | 10/2017 |
| EP | 2182386 A2 | 5/2010 |

(Continued)

OTHER PUBLICATIONS

Eurpoean Search Report Application No. EP20213881; dated May 10, 2021; pp. 9.

(Continued)

*Primary Examiner* — Katina N. Henson
(74) *Attorney, Agent, or Firm* — Cantor Colburn LLP (57) ABSTRACT

Disclosed is an aircraft having motors operable to actuate an aircraft windshield wiper and an aircraft control surface. The aircraft includes a distributed control system having digital storage and integrated with redundant processors. The aircraft includes controller instructions stored on the digital storage operable upon execution to operate a control surface motor of the motors to actuate the control surface to impact an orientation of the aircraft and operate a windshield wiper motor of the motors to actuate the windshield wipers.

18 Claims, 5 Drawing Sheets

(56) References Cited

U.S. PATENT DOCUMENTS

2013/0042428 A1   2/2013   Lieven et al.
2019/0061696 A1   2/2019   Vadgaonkar et al.
2019/0315483 A1  10/2019   Lapuyade et al.

FOREIGN PATENT DOCUMENTS

| EP | 3421305 A1 | 1/2019 |
| EP | 3632753 A1 | 4/2020 |
| KR | 20190133927 A | 12/2019 |
| WO | 2007018652 A1 | 2/2007 |

OTHER PUBLICATIONS

Search Report issued in European Patent Application No. 20213881.4; Application dated Dec. 14, 2020; dated Sep. 27, 2022 (6 pages).

* cited by examiner

WINDSHIELD WIPER OPERATIONS FOR AIRCRAFT

CROSS-REFERENCE TO RELATED APPLICATIONS

This application claims the benefit of India Patent Application Serial No. 201911051814 filed Dec. 13, 2019, the disclosure of which is incorporated herein by reference in its entirety.

BACKGROUND

The present disclosure relates to the art of windshield wipers for aircraft. Windshield wipers may be used to remove precipitation from aircraft windshields. Any number of windshield wipers may be used. Aircraft cockpits may include one or more seats for pilots and co-pilots. Windshield wipers may correspond with respective cockpit occupants.

BRIEF DESCRIPTION

Disclosed is an aircraft having motors operable to actuate an aircraft windshield wiper and an aircraft control surface. The aircraft includes a distributed control system having digital storage and integrated with redundant processors. The aircraft includes controller instructions stored on the digital storage operable upon execution to operate a control surface motor of the motors to actuate the control surface to impact an orientation of the aircraft and operate a windshield wiper motor of the motors to actuate the windshield wipers.

In addition to one or more of the features described above, or as an alternative, further embodiments may include that the distributed control system includes motor controller blades operable to receive motor control directives associated with the motors, and send control signals to the motors.

In addition to one or more of the features described above, or as an alternative, further embodiments may include that the control surface motor is associated with a valve operable to control the control surface.

In addition to one or more of the features described above, or as an alternative, further embodiments may include a precipitation condition associated with the aircraft, and the controller instructions are further operable upon execution by the distributed control system to read the weather data and operate the windshield wiper motor based on the weather data.

In addition to one or more of the features described above, or as an alternative, further embodiments may include global position data stored on the digital storage that define a position of the aircraft, and wherein the precipitation condition is defined based on the radar density patterns associated with the position.

In addition to one or more of the features described above, or as an alternative, further embodiments may include that the radar density patterns define a density respective a precipitation threshold and define the precipitation condition as heavy precipitation in response to the density being below the precipitation threshold and define the precipitation condition as light precipitation in response to the density being above the precipitation threshold.

In addition to one or more of the features described above, or as an alternative, further embodiments may include that the controller instructions are further operable upon execution by the distributed control system to operate the windshield wiper motor at a predetermined speed command based on the weather data in response to the precipitation condition being heavy precipitation and the controller instructions operate the windshield wiper motor.

In addition to one or more of the features described above, or as an alternative, further embodiments may include that the controller instructions are further operable upon execution by the distributed control system to operate the windshield wiper motor to pause at an extreme orientation of the windshield wiper motor based on the weather data in response to the precipitation condition being light precipitation and the controller instructions operate the windshield wiper motor.

In addition to one or more of the features described above, or as an alternative, further embodiments may include a weather radar, and wherein the controller instructions are further operable upon execution by the distributed control system to operate the weather radar and define the weather data according to the weather radar.

In addition to one or more of the features described above, or as an alternative, further embodiments may include status data stored on the digital storage based on a flight status of the aircraft stored on the digital storage, and the controller instructions are further operable upon execution by the distributed control system to read the status data and operate the windshield wiper motor based on the status data.

In addition to one or more of the features described above, or as an alternative, further embodiments may include that the controller instructions are further operable upon execution by the distributed control system to operate the windshield wiper motor in response to the status data corresponding to an aircraft taxi status and the controller instructions operate the windshield wiper motor at a predetermined speed command.

In addition to one or more of the features described above, or as an alternative, further embodiments may include that the controller instructions are further operable upon execution by the distributed control system to operate the windshield wiper motor based on the status data corresponds to an aircraft taking off status and the controller instructions operate the windshield wiper motor at a predetermined speed command.

In addition to one or more of the features described above, or as an alternative, further embodiments may include weather data based on radar density patterns that define a precipitation condition associated with the aircraft and status data based on a flight status of the aircraft stored on the digital storage, the controller instructions are further operable upon execution by the distributed control system to operate the windshield wiper motor while the status data corresponds to an aircraft taxiing status or an aircraft taking off status and in response to the precipitation condition being heavy precipitation and the controller instructions operate the windshield wiper motor at a predetermined speed command.

Also disclosed is a method for controlling operation of a windshield wiper of an aircraft with a distributed control system having digital storage disposed therein. The method includes reading weather data from the digital storage, the weather data based on radar density patterns that define a density respective a precipitation threshold and define the precipitation condition as heavy precipitation in response to the density being below the precipitation threshold and define the precipitation condition as light precipitation in response to the density being above the precipitation threshold. The method includes operating a windshield wiper motor defining an extreme orientation with a predetermined speed command in response to the precipitation condition being light precipitation and with a pause at the extreme orientation.

In addition to one or more of the features described above, or as an alternative, further embodiments may include reading status data from the digital storage based on a flight status of the aircraft and operating the windshield wiper motor with the predetermined speed command only in response the status data corresponds to an aircraft taxiing status or an aircraft taking off status.

Also disclosed is an aircraft. The aircraft includes a windshield wiper. The aircraft includes a windshield wiper motor operable to actuate the windshield wiper. The aircraft includes a distributed control system having a motor controller blade, the distributed control system including controller instructions operable upon execution by the distributed control system to operate the motor controller blade and control the windshield wiper motor according to a predetermined speed command and a specific time interval pause, the motor controller blade being operable upon execution by the distributed control system to read the weather data to operate the windshield wiper motor based on the weather data.

In addition to one or more of the features described above, or as an alternative, further embodiments may include an aileron motor, an elevator motor, and a rudder motor.

In addition to one or more of the features described above, or as an alternative, further embodiments may include that valves associated with the aileron motor, the elevator motor, and the rudder motor are operable to control a respective aileron, elevator, and rudder, wherein the motor controller blade is further configured to control the operation of the aileron motor, the elevator motor, or the rudder motor.

In addition to one or more of the features described above, or as an alternative, further embodiments may include weather data based on radar density patterns that define a precipitation condition associated with the aircraft stored on the digital storage, and the controller instructions are further operable upon execution by the distributed control system to read the weather data and operate the windshield wiper motor based on the weather data.

In addition to one or more of the features described above, or as an alternative, further embodiments may include that the controller instructions are further operable upon execution by the distributed control system to operate the windshield wiper motor based on the weather data in response to the precipitation condition being heavy precipitation and the controller instructions operate the windshield wiper motor at a predetermined speed command.

In addition to one or more of the features described above, or as an alternative, further embodiments may include that the controller instructions are further operable upon execution by the distributed control system to operate the windshield wiper motor based on the weather data in response to the precipitation condition being light precipitation and the controller instructions operate the windshield wiper motor to pause at an extreme orientation of the windshield wiper motor.

BRIEF DESCRIPTION OF THE DRAWINGS

The following descriptions should not be considered limiting in any way. With reference to the accompanying drawings.

DETAILED DESCRIPTION

A detailed description of one or more embodiments of the disclosed apparatus and method are presented herein by way of exemplification and not limitation with reference to the Figures.

Figure 1:
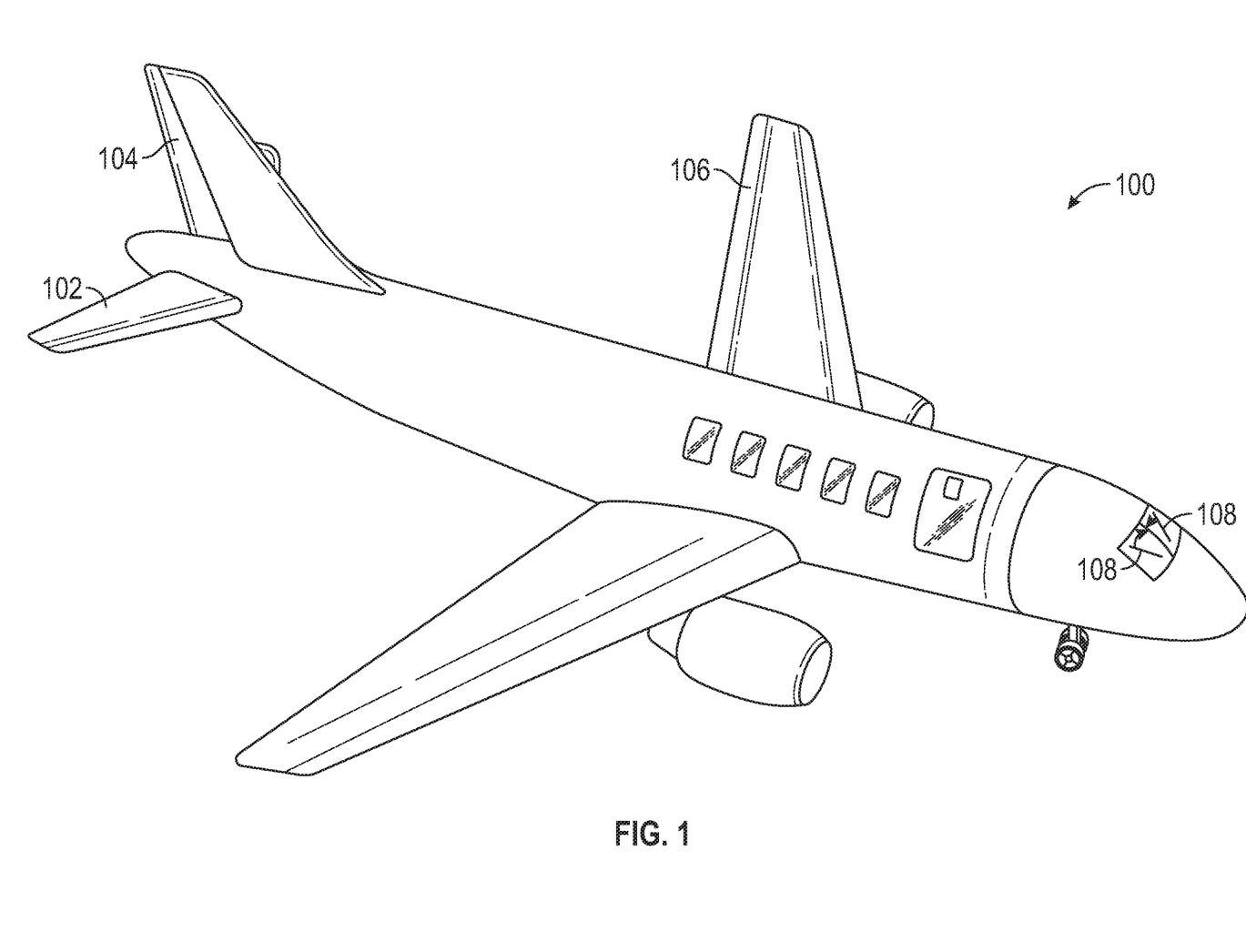
FIG. 1 illustrates an aircraft in accordance with one or more implementations of the present disclosure.

Referring to FIG. 1, an aircraft 100 is shown. The aircraft 100 includes at least one elevator 102, rudder 104, and aileron 106 (control surfaces). It should be appreciated that the aircraft 100 may be either fixed wing or rotor wing. It should be appreciated that any number of orientation implementations may be used and are contemplated by this disclosure. The aircraft 100 may include any number of windshields and windshield wipers 108, as shown. The windshield wipers 108 may remove precipitation and other debris from the windshield that may obstruct or obfuscate an occupant's view.

Figure 2:
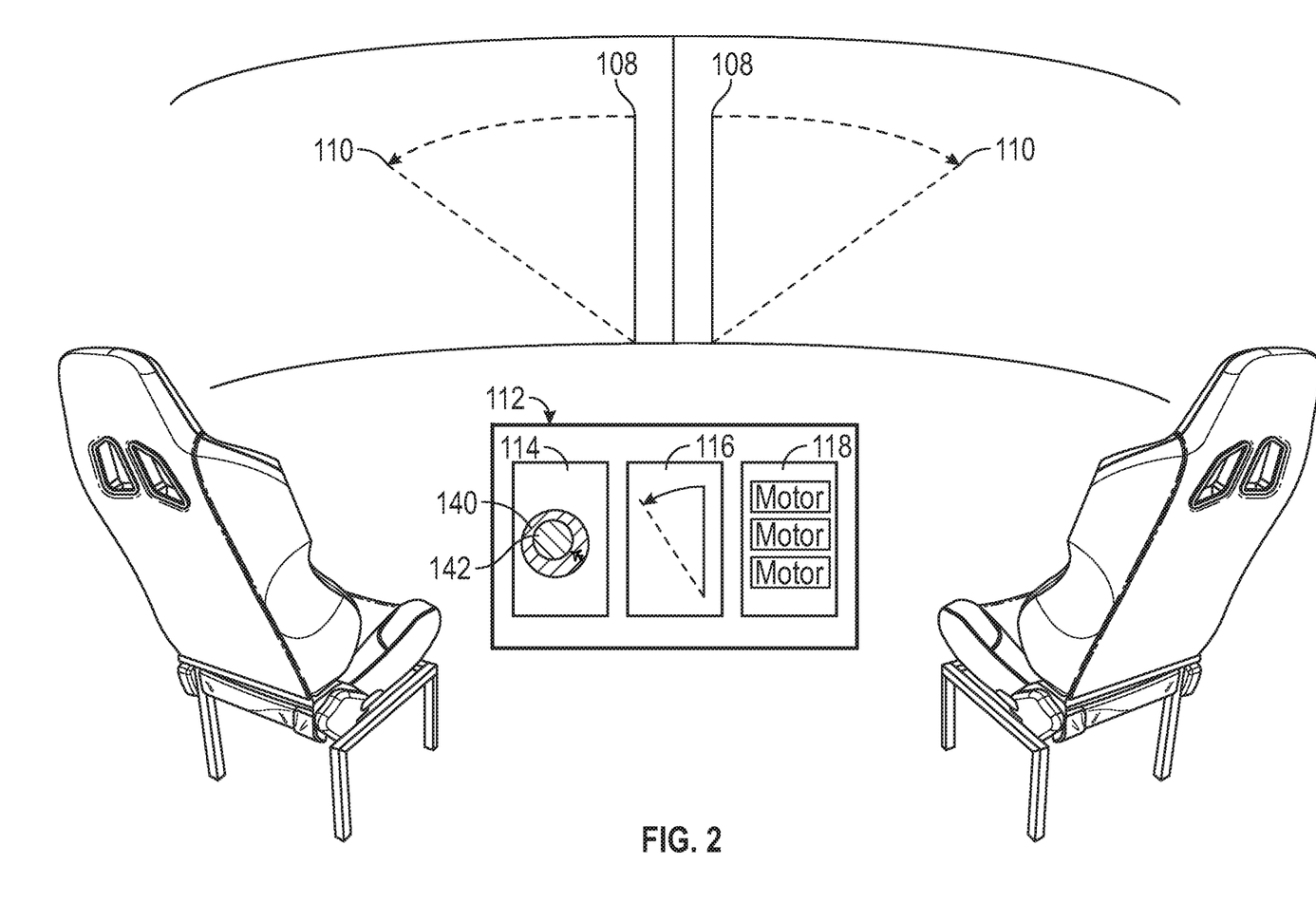
FIG. 2 illustrates an aircraft cockpit in accordance with one or more implementations of the present disclosure.

Turning now to FIG. 2, an interior of a cockpit is shown. As shown through the windshield, the windshield wipers 108 operate according to the travel path shown to an extreme orientation 110. The extreme orientation 110 may be defined by a physical limit, mechanical limit, software limit, instructional limit, or any combination thereof. The extreme orientation 110 may be defined by any type of limitation. The cockpit may include a human-machine interface or display 112. The display 112 may provide an interface for operators in the cockpit to interact with controllers of the aircraft 100. That is, the display 112 may be a touchscreen or other interactive device that provide an interface with the controllers. The display 112 may only provide indications and be associated with any number of switches and mechanisms for interacting with the controllers of the aircraft 100. The controllers are those devices including software which control the position and motion of various aircraft elements such as the control surfaces, windshield wipers and landing gear.

The display 112 may include an inclement weather display 114. The inclement weather display 114 may include a light precipitation indication 140 and a heavy precipitation indication 142. The display 112 may include a windshield wiper position indication 116. The windshield wiper position indication 116 may include an interactive portion operable to enable operation of the windshield wiper 108. The display 112 may include an indication of motor operation display 118 associated with the motion and position of the control surfaces. The inclement weather display 114 may be on an individual page of the display 112 or situated adjacent to other display objects of the display 112 like the windshield wiper position indication 116 or the motor operation display 118. In one example, the weather display 114 and the windshield wiper position indication 116 may be situated on the same page and the motor operation display 118 may be positioned on another page. In the example, the weather display 114 and the windshield wiper position indication 116 may be automatically brought to the front of the display 112 based on the light precipitation indication 140 or the heavy precipitation indication 142. That is, the presence of the light precipitation indication 140 or the heavy precipitation indication 142 may cause the weather display 114 or the windshield wiper position indication 116 to pop-up or automatically actuate. The pop-up may provide status or provide an interface to actuate the windshield wipers 108.

Figure 3:
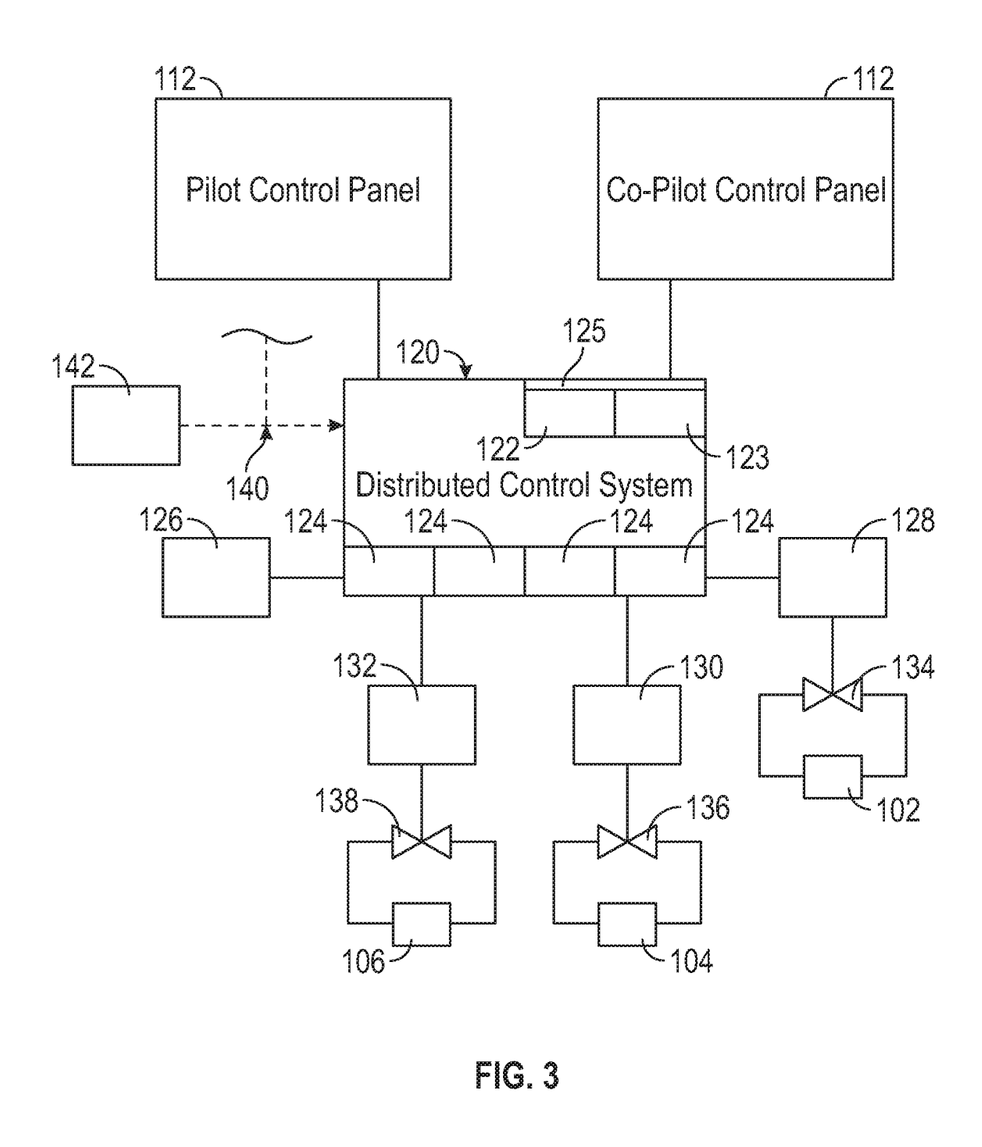
FIG. 3 illustrates a distributed control system of an aircraft in accordance with one or more implementations of the present disclosure.

Referring to FIG. 3, a distributed control system 120 is shown. As an example, the distributed control system 120 may be an integrated modular avionics system. The distributed control system 120 may include any combination of processors 122, field programmable gate arrays (FPGA), or application specific integrated circuits (ASIC), referred to collectively as processors. The processors 122 may be redundant to ensure distributed reliability. The distributed processing may be swappable to ensure reliability of control functions. The distributed control system 120 may integrated on one rack. As such, the distributed control system may be an integrated control system providing aircraft-wide control functions.

The distributed control system 120 may include digital storage 123, which may include volatile and non-volatile memory cells, operable to store machine or controller instructions from the processors 122 and other processing mechanisms to receive, calculate, and control devices, as necessary. The processors 122 and storage 123 may be disposed on one or more substrates 125 individually or collectively associated with the distributed control system 120. Machine instructions may be stored (e.g., stored instructions, stored machine instructions, stored steps) in any language or representation, including but not limited to machine code, assembly instructions, C, C++, C#, PASCAL, COBAL, PYTHON, JAVA, and RUBY. It should be appreciated that any type of wired or wireless configuration is appreciated for any of the communications from the controller to the items controlled. Wireless protocols such as ZIGBEE, WI-FI, BLUETOOTH, or any other implement may be used. Communications may be realized through any protocol or medium known or unknown. Reading data may include any number of instructive combinations to access memory and memory cells having data retained therein.

Figure 4:
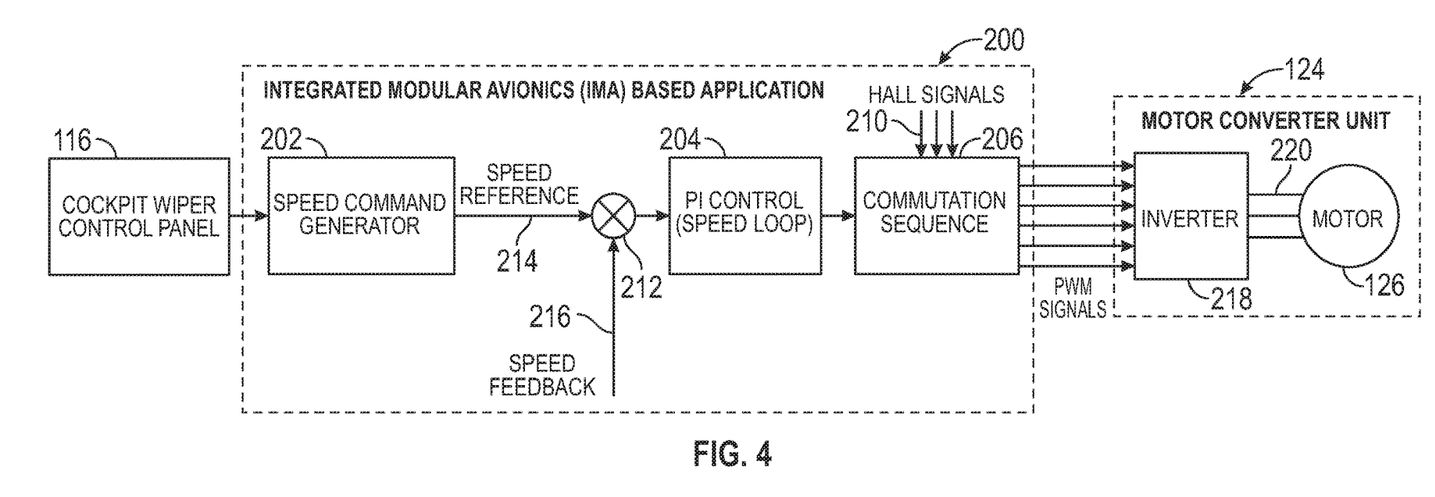
FIG. 4 illustrates a control process of a windshield wiper motor in accordance with one or more implementations of the present disclosure.

The distributed control system 120 may include multiple processors 122 coordinated to provide information assurance. As an example, the processors 122 may be coordinated to alleviate the Byzantine General Problem or other integrity and availability issues. The distributed control system 120 may include motor controller blades 124 or modules. The motor controller blades 124 may be implemented as cards, circuitry, or other implements operable to receive motor control directives from the distributed control system 120 associated with the windshield wiper motor 126, elevator motor 128, rudder motor 130, and aileron motor 132. The motor controller blades 124 may include an inverter 218 (as shown in FIG. 4) for converting the motor control directives from the distributed control system 120 into motor operative control signals. The motor operative control signals may include voltage and current for operating the motors 126, 128, 130, 132. The motors 128, 130, 132 may be associated with respective valves 134, 136, 138 configured to control hydraulic fluid configured to operate the elevator 102, rudder 104, and aileron 106 or the motors may be mechanically coupled directly to the control surfaces to operate the control surfaces.

Turning to FIG. 4, a control process associated with the windshield wiper motor 126 is shown. The windshield wiper indication 116 may be operable to enable automatic or manual actuation of the windshield wiper motor 126. The distributed control system 120 includes instructions 200 for generating windshield wiper motor control directives. The instructions 200 include a speed command generator 202. The speed command generator 202 may include instructions operable upon execution to access the digital storage 123 to read weather data based on radar density patterns that define a precipitation condition associated with or in a vicinity of the aircraft 100. The weather data may be stored in any format or condition. The weather data may be received over communications channels of the aircraft 100 associated with the distributed control system 120. The weather data may associate radar density readings with global positioning coordinates as global position data to define radar density patterns. The radar density patterns may be displayed on the inclement weather display 114. Radar density readings may be associated with various thresholds or categories. For example the radar density readings may defined as light precipitation or heavy precipitation based on the radar density readings being greater than or less than a precipitation threshold. The precipitation threshold may be defined based on historical windshield wiper usage.

The speed command generator 202 or wiper speed generator may also include instructions operable upon execution to access the digital storage 123 to read aircraft status data. The aircraft status data may be a categorical status of the aircraft 100 already determined as part of normal aircraft operations and available as part of the distributed control system. As an example, the status data may be a categorical indication of whether the aircraft 100 is taxiing, cruising, taking off, or landing. The status data may be based on actuator status related to landing gear position, elevator 102, rudder 104, or aileron 106 position. Typically, windshield wiper motor operation is only desirable when the aircraft status in the distributed control system is in the taxiing, taking off, or landing categories.

The speed command generator 202 may use weather data and the status data to determine a predetermined speed command associated with the windshield wiper motor 126. The status data may define a flight status of the aircraft. The predetermined speed command may be a maximum speed or any steady-state speed of the windshield wiper motor 126. As the windshield wiper motor 126 may be used in an oscillatory manner, the predetermined speed command may be any number of parameters used to establish the windshield wiper motor 126 position or velocity instructions to define the speed reference 214. The speed reference 214 may be variable speed determined to position the windshield wiper motor 126 properly. The speed reference 214 may be combined in summing block 212 with a speed feedback 216 to ensure the proper speed of the windshield wiper motor 126. The speed feedback 216 may be based on Hall-effect sensors associated with the windshield wiper motor 126. The summing block 212 may be fed into a proportional and integral control speed loop 204 to properly control the speed of the windshield wiper motor 126. The proportional and integral control speed loop 204 may be fed into a commutation sequence 206 that receives positions or counts from the Hall-effect signals 210. The commutation sequence 206 outputs motor control directives as pulse-width modulation signals to the motor controller blades 124. As such, an inverter 218 associated with the motor controller blades 124 may output direct drive signals 220 to operate the windshield wiper motor 126.

It should be appreciated that the windshield wiper motor 126 may be operated in various modes. The windshield wiper motor 126 may be operated to pause at the extreme orientation 110 for a specific time interval (e.g., 100 ms). The windshield wiper motor 126 may be operated or instructed to operate at a constant speed. The windshield wiper motor 126 may be operated to pause at the extreme orientation 110 in response to the precipitation condition is light precipitation. The windshield wiper motor 126 may be operated in the constant speed category in response to the status data corresponds to an aircraft taxiing status or an aircraft taking off status and in response to the precipitation condition is heavy precipitation. The windshield wiper motor 126 may be operated only in response to the status data corresponds to an aircraft taxiing status or an aircraft taking off status. The aircraft taxiing status may be based on a speed range of the aircraft. As an example, the aircraft taxiing status may include all speeds below a speed limit. The speed limit may be associated with airport taxiways. The aircraft taking off status may be based on a thrust range of the aircraft. As an example, an accelerative thrust within a taking off band may define the aircraft taking off status. It should be appreciated that any combination or sub-combination of the aforementioned is contemplated.

The aircraft 100 may include a weather radar 142. The weather radar 142 may be a radar operable to determine weather density patterns using the Doppler effect. The weather radar 142 may include lightning detectors. The weather radar 142 may include a satellite or other source weather radar information. The weather radar 142 may include any combination of these elements to generate the weather data. The aircraft may include other input devices such as global positioning system. The weather radar 142 and other systems may be configured to send data to the distributed control system on digital, analog, or other inputs. It should be appreciated that weather data and all other data stored in the distributed control system 120 may be received from off-board the aircraft through electromagnetic transmissions and other mediums.

Figure 5:
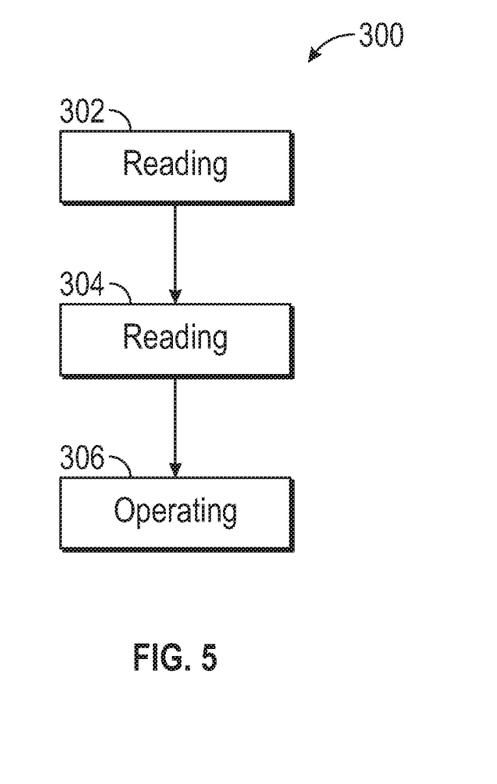
FIG. 5 illustrates a process in accordance with one or more embodiments of the present disclosure.

Referring to FIG. 5, a process 300 is shown in accordance with one or more implementations of the present disclosure. In step 302, weather data may be read from a digital storage 123. In step 304, status data may be read from a digital storage 123. In step 306, a windshield wiper motor 126 may be operated according to the weather data and the status data. As an example, the windshield wiper motor 126 may be operated with a predetermined speed command in response to the precipitation condition is light precipitation and with a pause at the extreme orientation 110. As another non-limiting example, the windshield wiper motor 126 may be operated with the predetermined speed command only in response to the status data corresponds to an aircraft taxiing status or an aircraft taking off status. Although this description contemplates both weather data and status data being already available from the distributed control system and hence available for control of the windshield wiper motor, it is also contemplated that stand alone weather and status systems could be used as inputs into a windshield wiper motor control system.

The terminology used herein is for the purpose of describing the features associated with the present disclosure and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to features and parts, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to any particular features or parts disclosed as the best mode contemplated for carrying out this present disclosure, but that the present disclosure will include all that falls within the scope of the claims.

What is claimed is:

1. An aircraft having motors operable to actuate an aircraft windshield wiper and an aircraft control surface comprising:
a distributed control system having digital storage and integrated with redundant processors; and
controller instructions stored on the digital storage operable upon execution to:
operate a control surface motor of the motors to actuate the control surface to impact an orientation of the aircraft, and
operate a windshield wiper motor of the motors to actuate the windshield wipers,
wherein:
the aircraft further comprises status data stored on the digital storage based on a flight status of the aircraft stored on the digital storage, and
the controller instructions are further operable upon execution by the distributed control system to read the status data and to operate the windshield wiper motor at a predetermined speed command based on the status data in response to the status data corresponding to aircraft taxi and taking off statuses and the controller instructions.

2. The aircraft of claim 1, wherein the distributed control system includes motor controller blades operable to receive motor control directives associated with the motors, and send control signals to the motors.

3. The aircraft of claim 2, wherein the control surface motor is associated with a valve operable to control the control surface.

4. The aircraft of claim 1, further comprising weather data stored on the digital storage based on radar density patterns that define a precipitation condition associated with the aircraft, and the controller instructions are further operable upon execution by the distributed control system to read the weather data and operate the windshield wiper motor based on the weather data.

5. The aircraft of claim 4, further comprising global position data stored on the digital storage that define a position of the aircraft, and wherein the precipitation condition is defined based on the radar density patterns associated with the position.

6. The aircraft of claim 5, wherein the radar density patterns define a density respective a precipitation threshold and define the precipitation condition as heavy precipitation in response to the density being below the precipitation threshold and define the precipitation condition as light precipitation in response to the density being above the precipitation threshold.

7. The aircraft of claim 5, wherein the controller instructions are further operable upon execution by the distributed control system to operate the windshield wiper motor at a predetermined speed command based on the weather data in response to the precipitation condition being heavy precipitation and the controller instructions operate the windshield wiper motor.

8. The aircraft of claim 7, wherein the controller instructions are further operable upon execution by the distributed control system to operate the windshield wiper motor to pause at an extreme orientation of the windshield wiper motor based on the weather data in response to the precipitation condition being light precipitation and the controller instructions operate the windshield wiper motor.

9. The aircraft of claim 5, further comprising a weather radar, and wherein the controller instructions are further operable upon execution by the distributed control system to operate the weather radar and define the weather data according to the weather radar.

10. The aircraft of claim 1, further comprising weather data based on radar density patterns that define a precipitation condition associated with the aircraft and status data based on a flight status of the aircraft stored on the digital storage, the controller instructions are further operable upon execution by the distributed control system to operate the windshield wiper motor while the status data corresponds to an aircraft taxiing status or an aircraft taking off status and in response to the precipitation condition being heavy precipitation and the controller instructions operate the windshield wiper motor at a predetermined speed command.

11. The aircraft of claim 1, wherein the distributed control system includes motor controller blades respectively implemented as a card for each of the motors and operable to receive motor control directives associated with each of the motors, and to send control signals to each of the motors.

12. The aircraft of claim 11, wherein each motor controller blade comprises an inverter to receive the control directives and to output direct drive signals to the associated motor.

13. A method for controlling operation of a windshield wiper of an aircraft with a distributed control system having digital storage disposed therein, the method comprising:
    reading weather data from the digital storage, the weather data based on radar density patterns that define a density respective a precipitation threshold and define the precipitation condition as heavy precipitation in response to the density being below the precipitation threshold and define the precipitation condition as light precipitation in response to the density being above the precipitation threshold;
    operating a windshield wiper motor defining an extreme orientation with a predetermined speed command in response to the precipitation condition being light precipitation and with a pause at the extreme orientation,
    wherein the method further comprises:
    reading status data from the digital storage based on a flight status of the aircraft; and
    operating the windshield wiper motor with the predetermined speed command only in response to the status data corresponding to an aircraft taxiing status or an aircraft taking off status.

14. An aircraft comprising:
    a windshield wiper;
    a windshield wiper motor operable to actuate the windshield wiper;
    a weather radar operable to obtain weather data associated with the aircraft; and
    a distributed control system having a motor controller blade, the distributed control system including controller instructions operable upon execution by the distributed control system to operate the motor controller blade and control the windshield wiper motor according to a predetermined speed command and a specific time interval pause, the motor controller blade being operable upon execution by the distributed control system to read the weather data to operate the windshield wiper motor based on the weather data and based on aircraft taxi and taking off statuses.

15. The aircraft of claim 14, further comprising an aileron motor, an elevator motor, and a rudder motor; and
    valves associated with the aileron motor, the elevator motor, and the rudder motor are associated with the valves operable to control a respective aileron, elevator, and rudder, wherein the motor controller blade is further configured to control the operation of the aileron motor, the elevator motor, or the rudder motor.

16. The aircraft of claim 15, further comprising weather data based on radar density patterns that define a precipitation condition associated with the aircraft stored on the distributed control system, and the controller instructions are further operable upon execution by the distributed control system to read the weather data and operate the windshield wiper motor based on the weather data.

17. The aircraft of claim 16, wherein the controller instructions are further operable upon execution by the distributed control system to operate the windshield wiper motor based on the weather data in response to the precipitation condition being heavy precipitation and the controller instructions operate the windshield wiper motor at a predetermined speed command.

18. The aircraft of claim 17, wherein the controller instructions are further operable upon execution by the distributed control system to operate the windshield wiper motor based on the weather data in response to the precipitation condition being light precipitation and the controller instructions operate the windshield wiper motor to pause at an extreme orientation of the windshield wiper motor.

* * * * *